United States Patent
Odaira

(10) Patent No.: US 9,049,599 B2
(45) Date of Patent: Jun. 2, 2015

(54) INFORMATION PROCESSING APPARATUS EQUIPPED WITH WIRELESS COMMUNICATION FUNCTION, METHOD OF CONTROLLING THE SAME, AND STORAGE MEDIUM

(71) Applicant: CANON KABUSHIKI KAISHA, Tokyo (JP)

(72) Inventor: Masahiro Odaira, Yokohama (JP)

(73) Assignee: CANON KABUSHIKI KAISHA (JP)

(*) Notice: Subject to any disclaimer, the term of this patent is extended or adjusted under 35 U.S.C. 154(b) by 0 days.

(21) Appl. No.: 13/673,031

(22) Filed: Nov. 9, 2012

(65) Prior Publication Data
US 2013/0139228 A1    May 30, 2013

(30) Foreign Application Priority Data
Nov. 24, 2011  (JP) ................................ 2011-256102

(51) Int. Cl.
| | |
|---|---|
| *H04W 12/08* | (2009.01) |
| *H04W 12/06* | (2009.01) |
| *H04L 29/06* | (2006.01) |
| *G06K 15/00* | (2006.01) |
| *G06F 21/60* | (2013.01) |

(Continued)

(52) U.S. Cl.
CPC .............. *H04W 12/08* (2013.01); *H04W 12/06* (2013.01); *H04L 63/205* (2013.01); *H04W 84/12* (2013.01); *G06K 15/4095* (2013.01); *G06F 21/608* (2013.01); *H04N 1/44* (2013.01)

(58) Field of Classification Search
CPC .............................. H04W 12/08; H04W 12/06
USPC ............................................................ 726/5
See application file for complete search history.

(56) References Cited

U.S. PATENT DOCUMENTS

2002/0093675 A1* 7/2002 Matsuda ....................... 358/1.15
2005/0055547 A1* 3/2005 Kawamura ..................... 713/155

(Continued)

FOREIGN PATENT DOCUMENTS

JP        2004120507 A       4/2004

OTHER PUBLICATIONS

Makda et al., "Security implications of cooperative communications in wireless networks", 2008, pp. 1-6.*

(Continued)

*Primary Examiner* — Yonas Bayou
(74) *Attorney, Agent, or Firm* — Rossi, Kimms & McDowell LLP

(57) ABSTRACT

An information processing apparatus capable of effectively preventing an unauthorized access in a manner cooperatively associated with a predetermined security setting of a wireless communication. An information processing apparatus is capable of wireless communication with an external apparatus, receives a job request therefrom, and executes job processing according to the job request. A CPU sets a management setting for managing users who use the information processing apparatus. The CPU receives the job request from the external apparatus via a wireless LAN interface. The CPU determines, when the job request is received, whether or not the wireless communication has been set to a predetermined security setting, and performs control, when it is determined that the wireless communication has not been set to the predetermined security setting, so as to refuse to accept the job request, unless the management setting has been set.

8 Claims, 11 Drawing Sheets

(51) Int. Cl.
  *H04N 1/44* (2006.01)
  *H04W 84/12* (2009.01)

(56) References Cited

U.S. PATENT DOCUMENTS

| | | | |
|---|---|---|---|
| 2005/0073726 A1* | 4/2005 | Nobuta et al. | 358/468 |
| 2005/0243365 A1* | 11/2005 | Noda | 358/1.15 |
| 2007/0177196 A1* | 8/2007 | Maeda | 358/1.15 |
| 2007/0229873 A1* | 10/2007 | Kato | 358/1.14 |
| 2007/0291284 A1* | 12/2007 | Kittaka et al. | 358/1.1 |
| 2008/0204798 A1* | 8/2008 | Taniguchi et al. | 358/1.15 |
| 2008/0297828 A1* | 12/2008 | Niikura et al. | 358/1.15 |
| 2011/0188079 A1* | 8/2011 | Suzuki et al. | 358/1.15 |
| 2011/0191631 A1* | 8/2011 | Suzuki et al. | 714/25 |
| 2013/0120794 A1* | 5/2013 | Kamoi | 358/1.15 |
| 2013/0141753 A1* | 6/2013 | Kamoi | 358/1.14 |

OTHER PUBLICATIONS

Narayan et al., "Network performance evaluation of wireless IEEE802.11n encryption methods on windows vista and windows server 2008 operating systems", 2009, pp. 1-5.*

* cited by examiner

FIG.6

| | DEPARTMENT ID MANAGEMENT | | ENABLED/DISABLED |
|---|---|---|---|
| 301 | | | |
| 302 | DEPARTMENT ID/SECRET IDENTIFICATION NUMBER | 1 | 1111/1234 |
| | | 2 | 2222/3456 |
| | | : | : |
| | | N | : |

*FIG.8*

| JOB TYPE | JOB EXECUTION WHEN THE DEPARTMENT ID MANAGEMENT SETTING IS OFF |
|---|---|
| PRINT | PERMITTED |
| FAX | NOT PERMITTED |

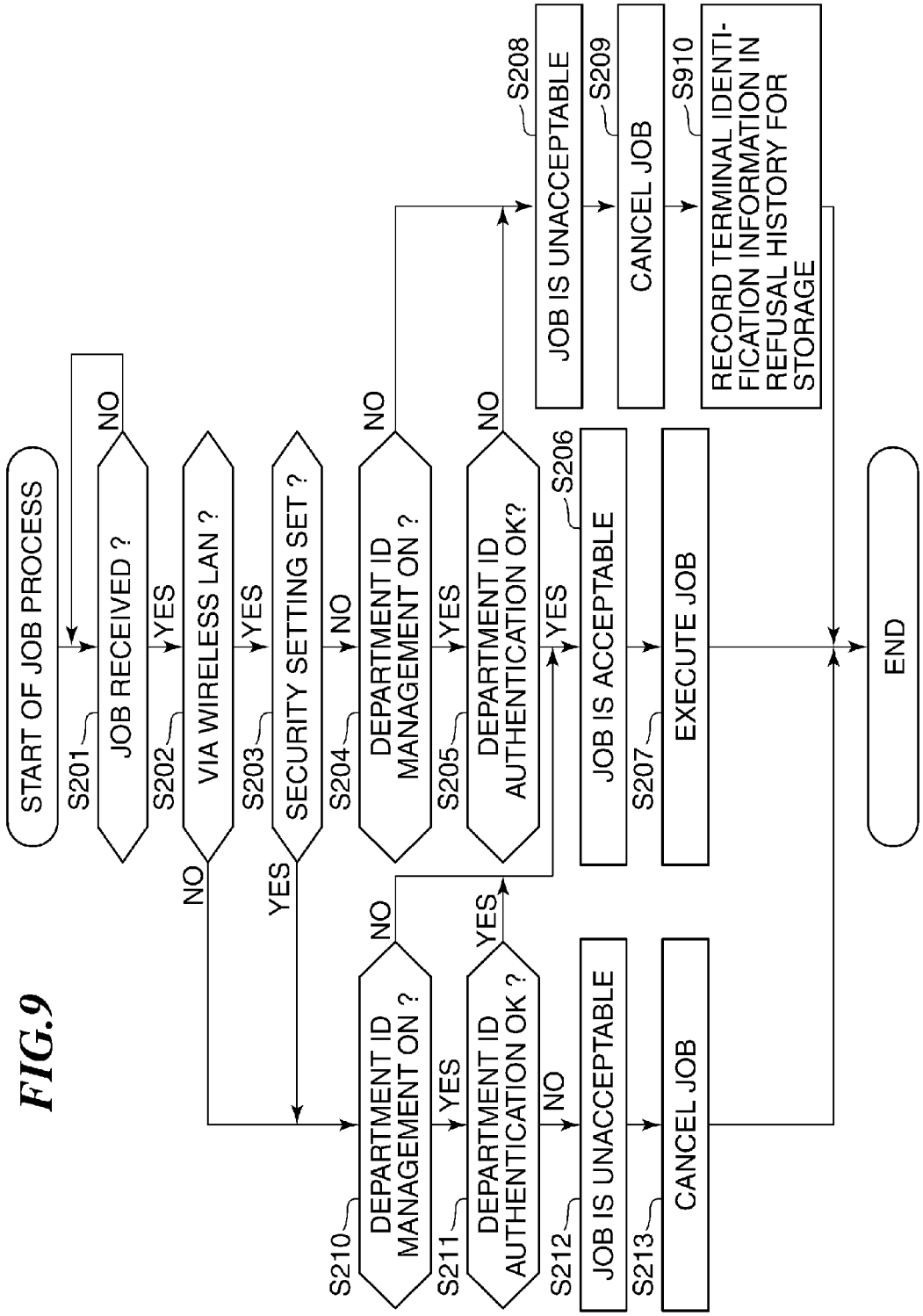

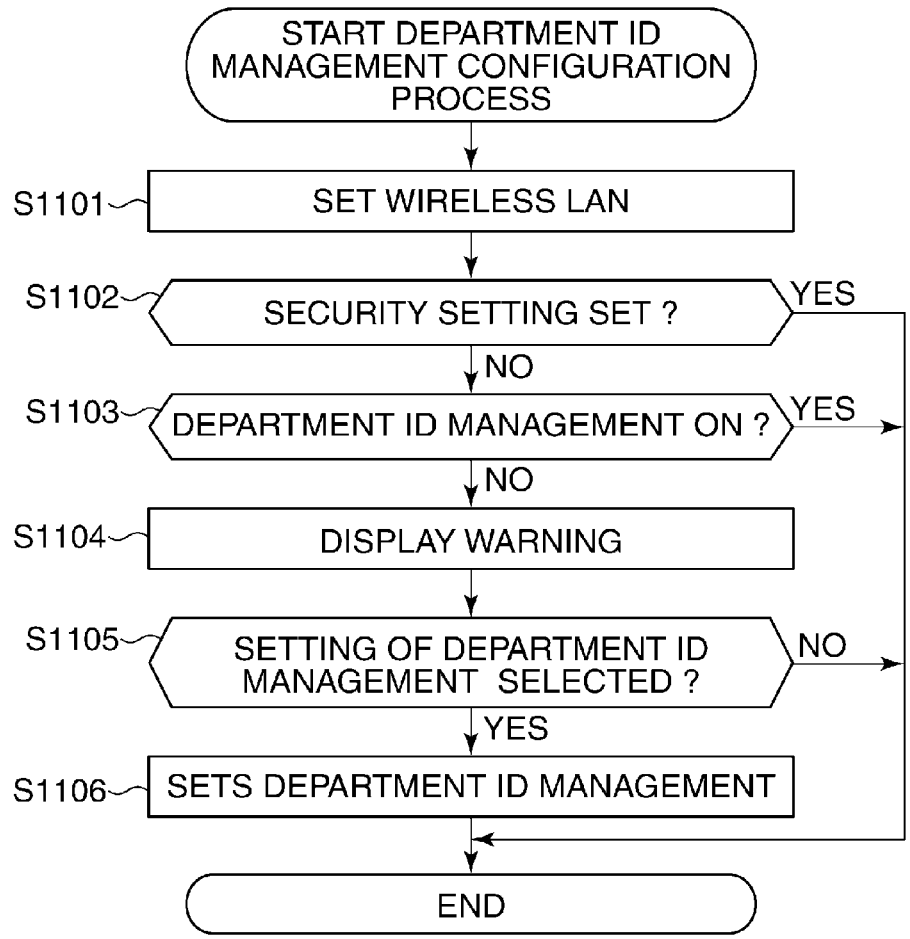

FIG.12

WARNING

This wireless LAN has not been set to security setting.
It is recommended that Department ID Management is set to be on. Do you wish to set Department ID Management to be on ?

YES — 1201
NO — 1202

INFORMATION PROCESSING APPARATUS EQUIPPED WITH WIRELESS COMMUNICATION FUNCTION, METHOD OF CONTROLLING THE SAME, AND STORAGE MEDIUM

BACKGROUND OF THE INVENTION

1. Field of the Invention

The present invention relates to an information processing apparatus equipped with a wireless information function, and more particularly to an information processing apparatus that is capable of connecting to a wireless LAN, a method of controlling the information processing apparatus, and a storage medium.

2. Description of the Related Art

Among conventional image forming apparatuses (e.g. printers or multifunction peripherals) as one type of information processing apparatuses, some are equipped with a wireless communication function. This type of image forming apparatus sometimes executes a print job, for example, by communication with an external apparatus, such as a PC (personal computer), by way of a wireless LAN.

When an image forming apparatus is enabled to communicate with external apparatuses via a wireless LAN, the image forming apparatus needs to be provided with a security function for prevention of being illegally accessed. In general, for the wireless LAN, it is known that the security function is realized by encryption based on WEP (Wired Equivalent Privacy), WPA (Wi-Fi Protected Access), WPA2 (Wi-Fi Protected Access 2), or a like other encryption method.

However, there can be provided a wireless LAN access point (wireless AP) in which the security function thereof has been configured to be disabled. If the image forming apparatus is permitted to be accessed using such a wireless AP as a relaying point, the image forming apparatus has a risk of being illegally accessed by an unspecified external apparatus.

On the other hand, in the case of an image forming apparatus equipped with a department ID management function, the use of the apparatus by persons other than the staff who are registered beforehand by the department ID management function is restricted (see Japanese Patent Laid-Open Publication No. 2004-120507).

As described above, by using the wireless LAN, an external apparatus can input a print job or a FAX job to the image forming apparatus, to thereby perform printout or FAX transmission.

However, if the security function of an wireless AP has been configured to be disabled, in other words, if there exists a wireless AP whose security function is disabled or made ineffective, there is a fear that an external apparatus illegally inputs a print job or a FAX job to the image forming apparatus.

Particularly, if an unspecified external apparatus inputs a FAX job and the image forming apparatus having received the FAX job executes FAX transmission, telephone line usage is illegally charged.

In the Japanese Patent Laid-Open Publication No. 2004-120507, although the use of the image forming apparatus by persons other than the staff who are registered beforehand by using the department ID management function is restricted, settings of the security function of the wireless LAN and settings of the department ID management function are not cooperatively associated with each other, and it is required to configure two categories of settings, respectively.

Therefore, for example, even though the security function of a wireless AP has been set to be disabled, the administrator sometimes carelessly fails to change the settings of the department ID management function. In such a case, there is a fear that it is impossible to prevent unauthorized access.

SUMMARY OF THE INVENTION

The present invention provides an information processing apparatus capable of effectively preventing an unauthorized access in a manner cooperatively associated with a predetermined security setting of a wireless communication, and a method of controlling the information processing apparatus, and a storage medium.

In a first aspect of the present invention, there is provided an information processing apparatus that is capable of wireless communication with an external apparatus, receives a job request from the external apparatus, and executes job processing according to the job request, comprising a first setting unit configured to set a management setting for managing users who use the information processing apparatus, a reception unit configured to receive the job request from the external apparatus via a wireless communication, a determination unit configured to determine, when the job request is received by the reception unit via the wireless communication, whether or not the wireless communication has been set to a predetermined security setting, and a control unit configured to perform control, when it is determined by the determination unit that the wireless communication has not been set to the predetermined security setting, so as to refuse to accept the job request, unless the management setting has been set.

In a second aspect of the present invention, there is provided a method of controlling an information processing apparatus that is capable of wireless communication with an external apparatus, receives a job request from the external apparatus, and executes job processing according to the job request, comprising receiving the job request from the external apparatus via a wireless communication, determining, when the job request is received via the wireless communication, whether or not the wireless communication has been set to a predetermined security setting, and refusing to accept the job request, when it is determined that the wireless communication has not been set to the predetermined security setting, unless a management setting for managing users who use the information processing apparatus has been set.

In a third aspect of the present invention, there is provided a non-transitory computer-readable storage medium storing a computer-executable program for causing a computer to execute a method of controlling an information processing apparatus that is capable of wireless communication with an external apparatus, receives a job request from the external apparatus, and executes job processing according to the job request, wherein the method comprises receiving the job request from the external apparatus via a wireless communication, determining, when the job request is received via the wireless communication, whether or not the wireless communication has been set to a predetermined security setting, and refusing to accept the job request, when it is determined that the wireless communication has not been set to the predetermined security setting, unless a management setting for managing users who use the information processing apparatus has been set.

According to the present invention, even in a case where the wireless communication has not been set to a predetermined security setting, it is possible to effectively prevent unauthorized access.

Further features of the present invention will become apparent from the following description of exemplary embodiments with reference to the attached drawings.

BRIEF DESCRIPTION OF THE DRAWINGS

FIG. 6 is a diagram showing an example of a department ID management table configured in the image forming apparatus.

FIG. 8 is a diagram showing an example of a job execution permission/inhibition table in which permission or inhibition of job execution is set according to a job type, in the image forming apparatus as the information processing apparatus according to the second embodiment.

FIG. 9 is a flowchart of a job process executed by an image forming apparatus as an information processing apparatus according to a third embodiment of the present invention.

FIG. 10 is a diagram showing an example of a wireless LAN unauthorized access list displayed on a console panel according to a refusal history table, in the image forming apparatus as the information processing apparatus according to the third embodiment.

FIG. 11 is a flowchart of a department ID management configuration process executed by an image forming apparatus as an information processing apparatus according to a fourth embodiment of the present invention.

FIG. 12 is a diagram showing an example of a warning display displayed on the console panel appearing in FIG. 1.

DESCRIPTION OF THE EMBODIMENTS

The present invention will now be described in detail below with reference to the accompanying drawings showing an embodiment thereof. Note that in the following, an image forming apparatus, such as a multifunction peripheral, which is an example of the information processing apparatus, is described.

Figure 1:
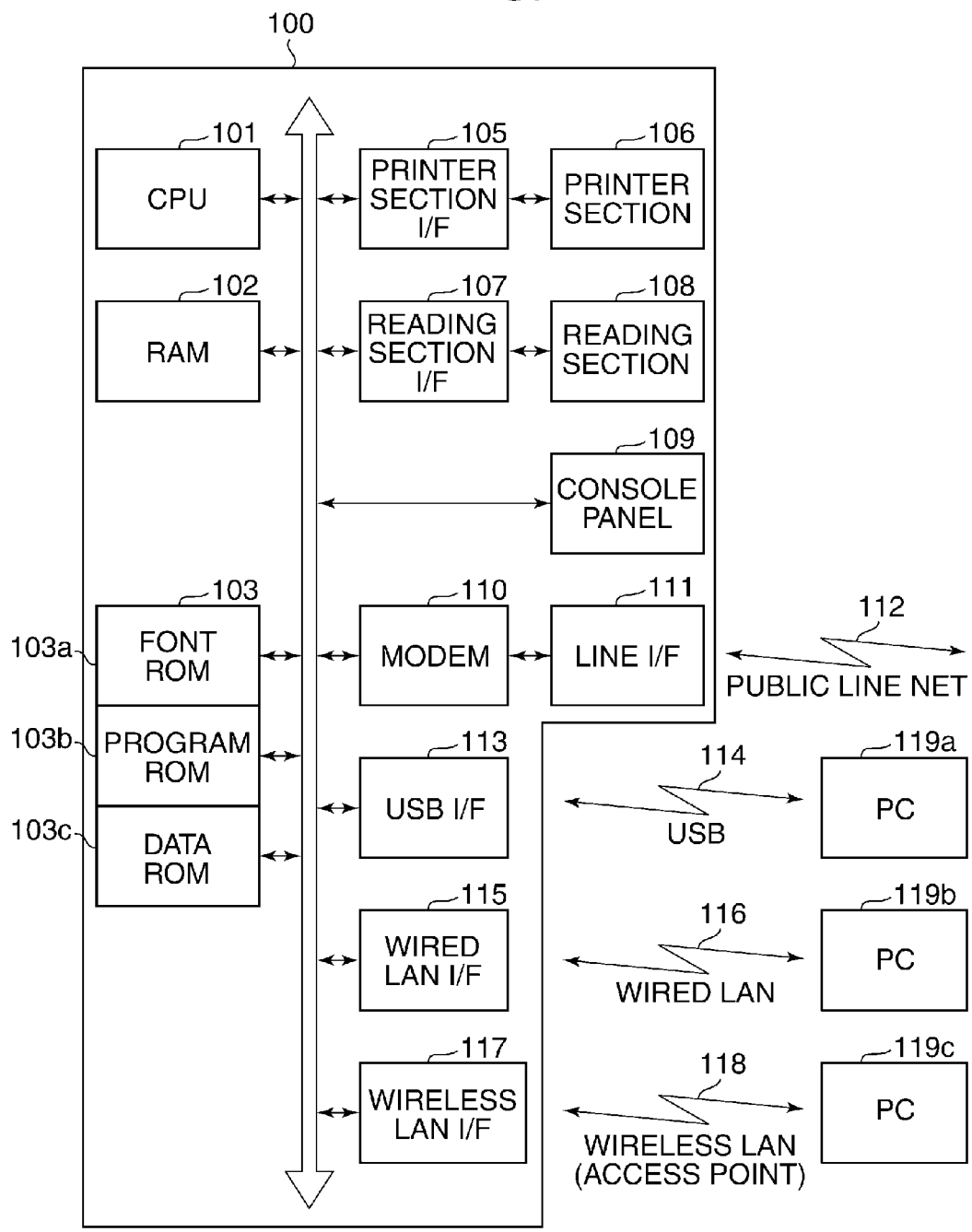
FIG. 1 is a block diagram showing an image forming apparatus as an information processing apparatus according to a first embodiment of the present invention, together with PCs.

FIG. 1 is a block diagram showing an image forming apparatus as an information processing apparatus according to a first embodiment of the present invention, together with PCs (personal computers).

In FIG. 1, the image forming apparatus is shown as an example of the information processing apparatus. The image forming apparatus 100 shown in FIG. 1 includes a CPU 101, a RAM 102, a ROM 103, a printer section (printer engine) 106, a reading section (scanner) 108, a console panel 109, a modem 110. As shown in FIG. 1, the CPU 101, the RAM 102, the ROM 103, the console panel 109, and the modem 110 are connected to a system bus 101a. Further, the printer section 106 and the reading section 108 are connected to the system bus 101a via a printer section interface 105 and a reading section interface 107, respectively.

Further, to the system bus 101a, a USB interface 113, a wired LAN interface 115, and a wireless LAN interface 117 are connected, and to the modem 110 a line interface 111 is connected. The ROM 103 is, for example, an electrically erasable programmable ROM, and includes a font ROM 103a, a program ROM 103b, and a data ROM 103c. The font ROM 103a stores font information and the program ROM 103b stores various programs. Further, the data ROM 103c stores e.g. apparatus information on the image forming apparatus 100, telephone directory information on a user, and department control information, as setting information.

The CPU 101 controls the image forming apparatus 100 according to various control programs stored in the program ROM 103b. When each control program is executed, it is loaded from the program ROM 103b into the RAM 103. Note that the various programs may be stored in a hard disk drive (HDD: not shown). The CPU 101 reads out the above-mentioned setting information and renews the same, on an as-needed basis.

The printer section interface 105 provides an interface for outputting image data from the CPU 101 to the printer section 106. The CPU 101 displays characters and symbols on a display section, not shown, of the console panel 109, using the font information stored in the font ROM 103a. Further, CPU 101 executes processing according to instruction information received from the console panel 109.

The reading section interface 107 provides an interface for inputting image data obtained as a result of reading an original by the reading section 108. The CPU 101 performs predetermined processing on the image data input from the reading section interface 107, and outputs the processed image data to the printer section interface 105 as print data.

The modem 110 is connected to a public telephone line network 112 via the line interface 111. Further, the modem 110 communicates with other image forming apparatuses, fax machines, telephones, etc. (none of them are shown).

The USB interface 113 is connected via a USB 114 to a PC 119a which is an external apparatus. Further, the PC 119a can cause the image forming apparatus 100 to execute processing of a job, such as a print job, via the USB 114.

The wired LAN interface 115 is connected via a wired LAN 116 to a PC 119b. Further, PC 119b can cause the image forming apparatus 100 to execute processing of a job, such as a print job, via the wired LAN 116.

The wireless LAN I/F 117 is connected via a wireless LAN 118 to a PC 119c. When the wireless LAN 118 is used, relaying is executed by a wireless access point (wireless AP). Further, the PC 119c can cause the image forming apparatus 100 to execute processing of a job, such as a print job, via the wireless LAN 118, as will be described hereinafter. In short, the image forming apparatus 100 can execute wireless communication with external apparatuses, such as PCs.

Figure 2:
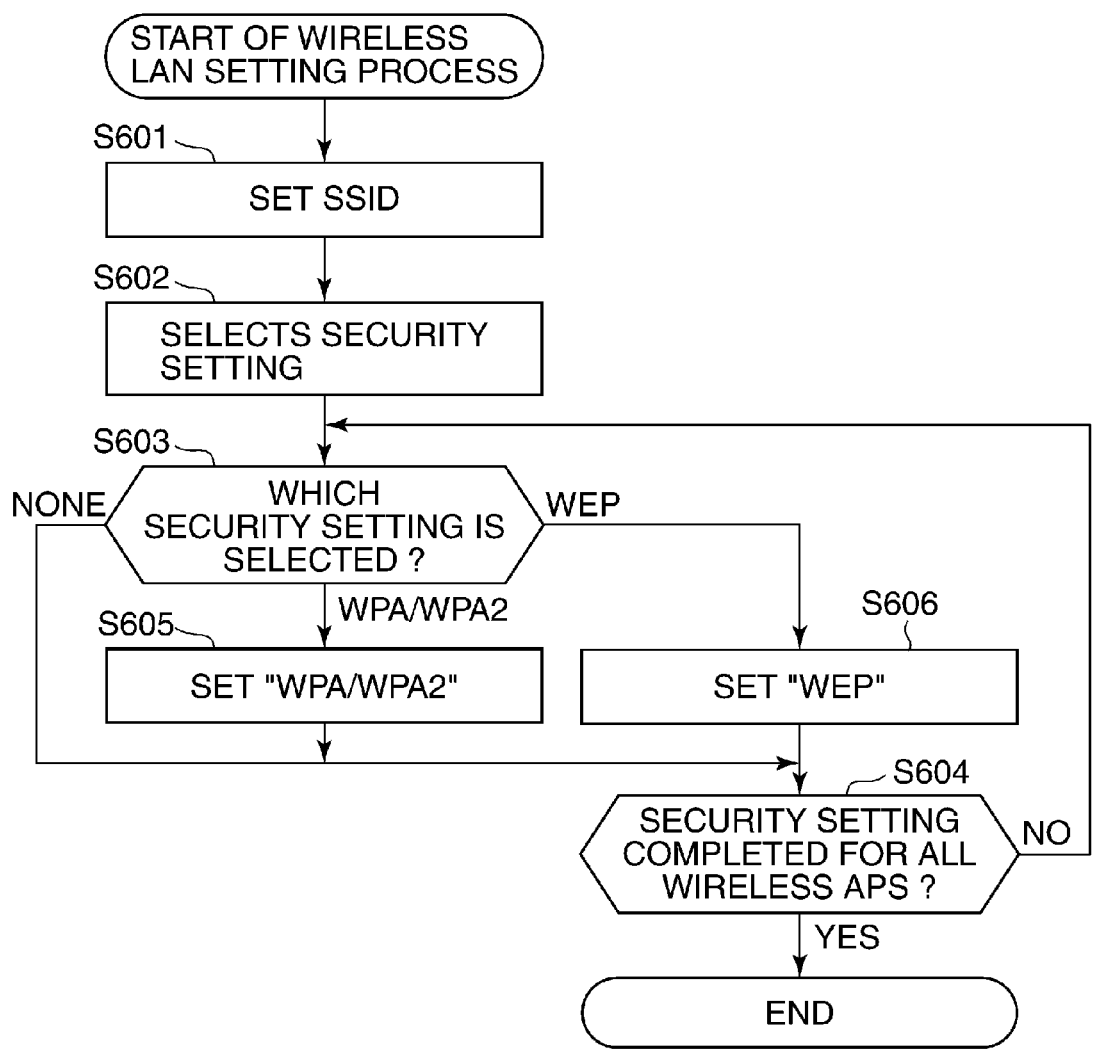
FIG. 2 is a flowchart of a wireless LAN-setting process executed by the image forming apparatus.

FIG. 2 is a flowchart of a wireless LAN setting process executed by the image forming apparatus shown in FIG. 1.

When setting the wireless LAN 118, first, an SSID (Service Set Identifier) which is an identifier of the wireless AP is set (step S601). In doing this, all SSIDs of wireless APs with which the image forming apparatus 100 can communicate are set. When the setting is performed by an administrator (user) from the console panel 109, the CPU 101 stores the SSIDs e.g. in the data ROM 103c.

Next, the administrator selects a security setting on a wireless AP-by-wireless AP basis (i.e. for each wireless LAN) by using the console panel 109 (step S602). In the illustrated example, the security setting is selected from "none", "WPA/WPA2", and "WEP".

Next, the CPU 101 determines, as to a selected one of all the wireless APs, which security setting is selected therefor (step S603). If the selected security setting is "none" ("none" to the step S603), then the CPU 101 proceeds to a step S604, and determines whether or not the security setting is completed for all the wireless APs.

If the security setting is not completed for all the wireless APs (NO to the step S604), the CPU 101 returns to the step S603, whereas if the security setting is completed for the all wireless APs (YES to the step S604), the CPU 101 terminates the wireless LAN setting.

If it is determined in the step S603 that the selected security setting is "WPA/WPA2" ("WPA/WPA2" to the step S603), the CPU 101 sets the selected wireless AP to "WPA/WPA2" (step S605), and then the present process proceeds to the step S604.

If it is determined in the step S603 that the selected security setting is "WEP" ("WEP" to the step S603), the CPU 101 sets the selected wireless AP to "WEP" (step S606), and then the present process proceeds to the step S604.

Thus, the image forming apparatus 100 performs security setting for all the wireless APs with which it can communicate. Note that the security settings are stored e.g. in the data ROM 103c.

Figure 3:
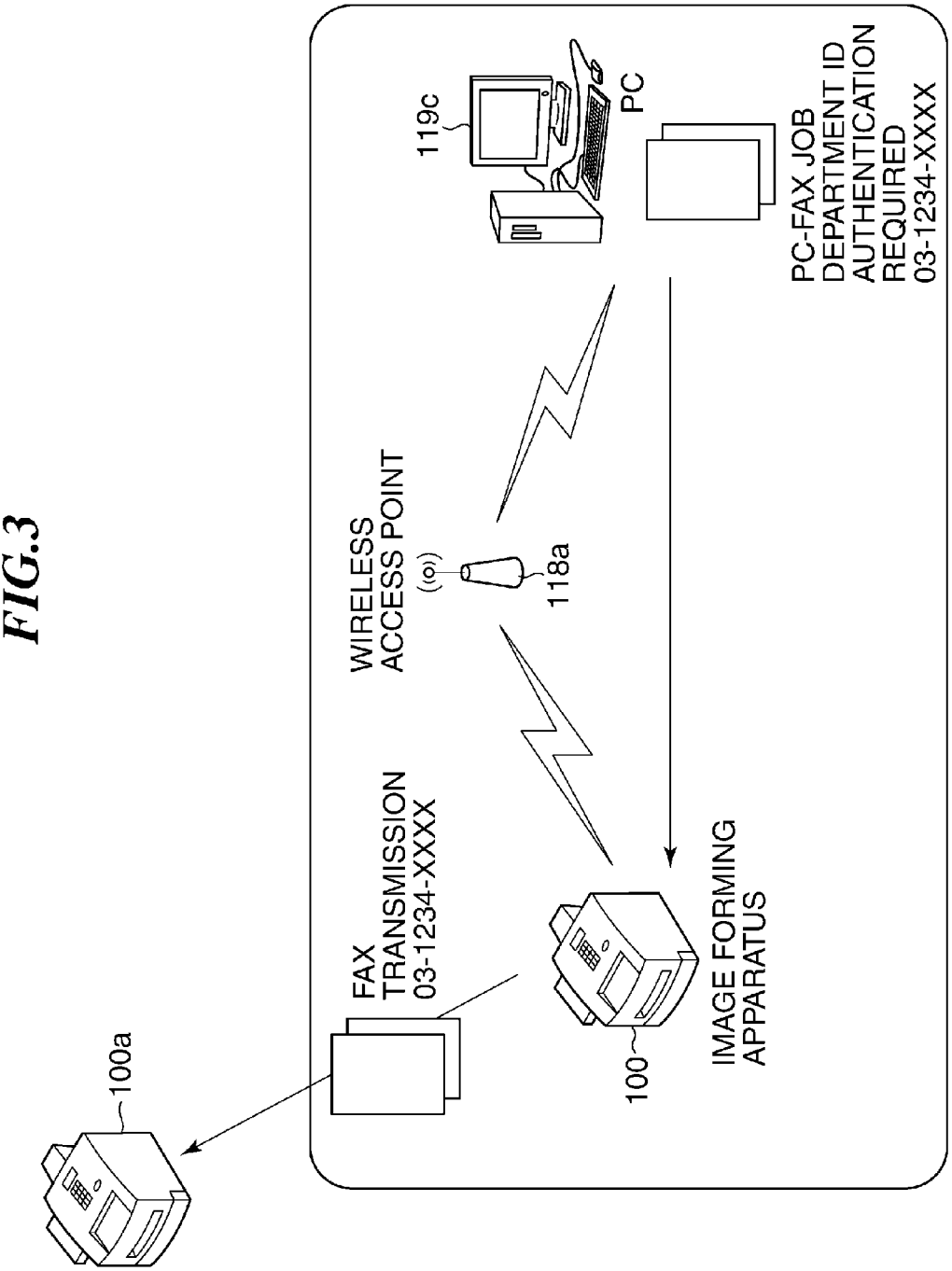
FIG. 3 is a diagram useful in explaining processing when the image forming apparatus receives a job via the wireless LAN.

FIG. 3 is a diagram useful in explaining processing when the image forming apparatus 100 receives a job via the wireless LAN.

Now, it is assumed that the image forming apparatus 100 receives a job request, such as a print job request (hereinafter also simply referred to as a job) via the wireless LAN 118 (wireless AP 118a in FIG. 3) from the PC 119c. When the PC 119c performs transmission of the job request (hereinafter referred to as job transmission), the PC 119c transmits a department ID and a secret identification number. Note that when the job transmission is executed via the USB 114 or the wired LAN 116 as well, the department ID and the secret identification number are transmitted.

Figure 4:
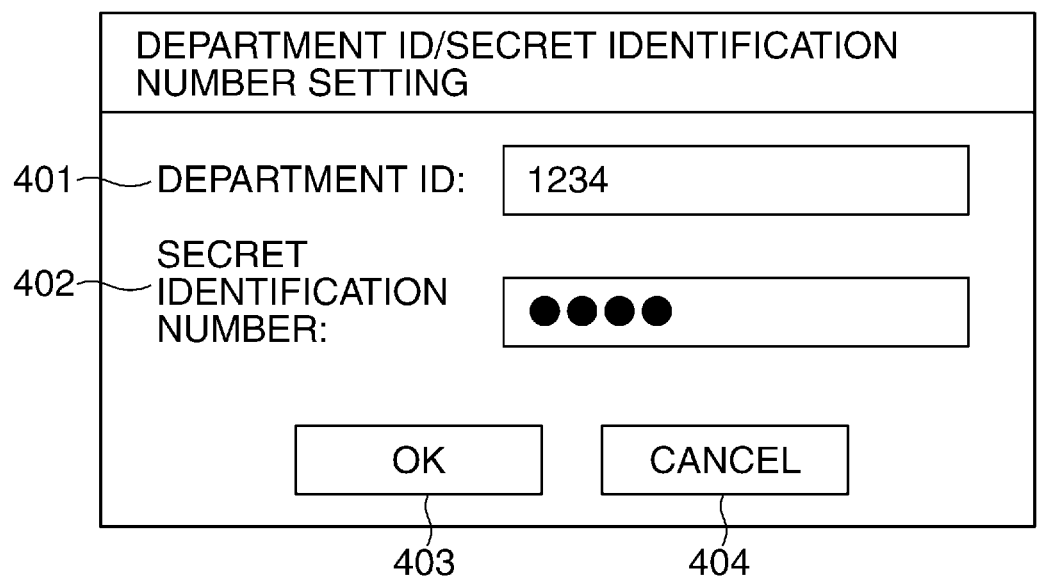
FIG. 4 is a diagram showing a setting screen for a department ID and a secret identification number, which is displayed when job transmission is executed from a PC appearing in FIG. 1.

FIG. 4 is a diagram showing a setting screen for a department ID and a secret identification number, which is displayed in the display when each of the PCs 119a to 119c appearing in FIG. 1 executes the job transmission.

On the illustrated setting screen, there are displayed a department ID field 401 for inputting the department ID for identification of a department of an office or the like, and a secret identification number field 402 for inputting the secret identification number assigned to the department ID. These department ID and secret identification number are user identification information for identifying the user who uses the image forming apparatus 100.

After inputting the department ID and the secret identification number on the setting screen, when the user depresses a setting button (OK) 403, the department ID and the secret identification number are transmitted as set user identification information, from the PC 119c to the image forming apparatus 100 via the wireless AP 118a, together with the job. In FIG. 4, reference numeral 404 denotes a cancel button for canceling a setting operation on the setting screen.

Note that the PC 119c is assumed to have been configured for the SSID and security concerning the wireless AP 118a. Upon receipt of the job and the department ID and secret identification number, the image forming apparatus 100 executes the job as will be described hereinafter.

Assuming that the transmitted job is e.g. a FAX job (PC-FAX job), the job has a telephone number set as a transmission destination. The CPU 101 of the image forming apparatus 100 receives the FAX job, and if the job can be accepted, the CPU 101 executes the FAX transmission to the telephone number of the destination via the modem 110 (execute the FAX transmission to an image forming apparatus 100a in the case of the illustrated example in FIG. 3).

Figure 5:
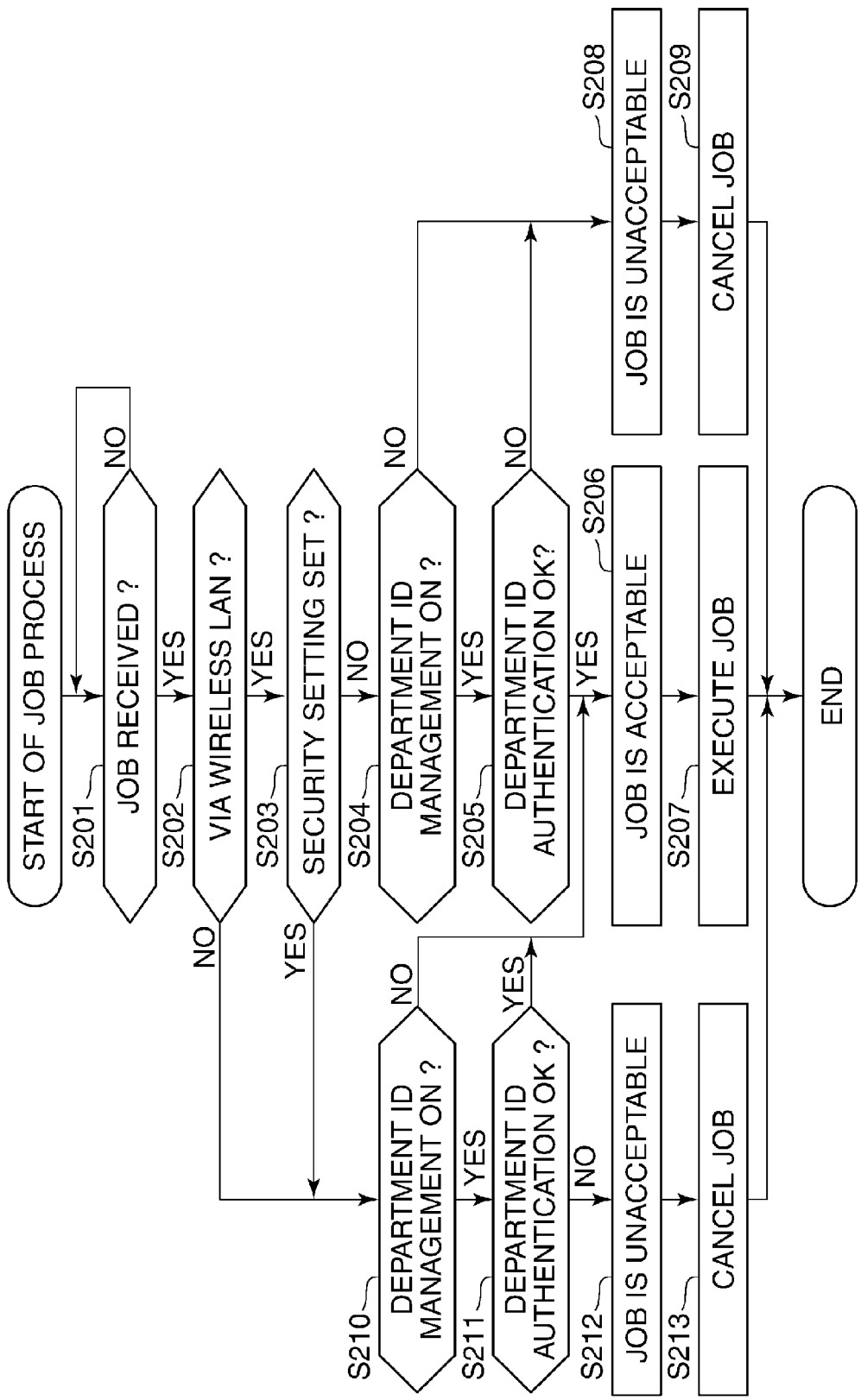
FIG. 5 is a flowchart of a job process executed by the image forming apparatus appearing FIG. 1.

FIG. 5 is a flowchart of a job process executed by the image forming apparatus shown in FIG. 1.

When causing the image forming apparatus 100 to execute a job, such as a print job, each of the PCs 119a to 119c transmits the department ID and the secret identification number together with the job, as described above. In the image forming apparatus 100, the CPU 101 determines whether or not a job is received (step S201). If a job is not received (NO to the step S201), the CPU 101 waits.

If a job is received (YES to the step S201), the CPU 101 determines whether or not the job is received by the wireless LAN I/F 117. In other words, the CPU 101 determines whether or not the job is received via the wireless LAN 118 (wireless communication) (step S202).

If the job is received via the wireless LAN 118 (YES to the step S202), the CPU 101 determines whether or not the wireless LAN 118 has been set to the security setting (step S203). As described in the wireless LAN setting process shown in FIG. 2, in the present embodiment, the security setting is selected from one of "none", "WPA/WPA2", and "WFP". So, if the selected security setting is "none", the CPU 101 determines that the wireless LAN 118 has not been set to the security setting.

If it is determined that the wireless LAN 118 has not been set to the security setting (NO to the step S203), the CPU 101 determines whether or the department ID management has been set to be on (i.e. "has been enabled") (step S204). Configuration of the department ID management (management setting) is performed e.g. by the administrator (user) using the console panel 109.

FIG. 6 is a diagram showing an example of a department ID management table set in the image forming apparatus 100.

In FIG. 6, the department ID management table includes a department ID management field 301 and a department ID/secret identification number field 302, and whether or not to enable the department ID management is set in the department ID management field 301. When the department ID management is to be executed, the department ID management field 301 is set to "enabled" (ON), whereas when the department ID management is not to be executed, the department ID management field 301 is set to "disabled" (OFF).

In the department ID/secret identification number field 302, the ID and the secret identification number for each department are set. In the example shown in FIG. 6, for each of N departments (N is an integer not less than 1), a department ID and a secret identification number associated therewith are set as configuration user identification information. Note that the department ID management table shown in FIG. 6 is stored e.g. in the data ROM 103c appearing in FIG. 1.

If it is determined in the step S204 that the department ID management has been set to be on (YES to the step S204), the CPU 101 determines whether or not an authentication result of the department ID is OK (step S205). As described hereinabove, when causing the image forming apparatus 100 to execute a job, each of the PCs 119a to 119c transmits the department ID and the secret identification number, as transmission user identification information, to the image forming apparatus 100.

If the transmitted department ID and the secret identification number match the department ID and the secret identification number stored in the data ROM 103c, the CPU 101 determines that the authentication result is OK. If the authentication result of the department ID is OK (YES to the step S205), the CPU 101 determines that the job can be accepted (step S206). Then the CPU 101 executes the received job (step S207). For example, if the received job is a print job, the CPU 101 executes the printing process by the printer section 106, followed by terminating the present job process.

Thus, in a case where the wireless communication has not been set to a predetermined security setting, if the department ID management setting has been set to be enabled, then the CPU 101 executes authentication according to the configuration user identification information and the transmission user identification information, and then determines whether or not to accept the job request, according to the authentication result.

If the authentication result of the department ID is not OK (NO to the step S205), the CPU 101 determines that the job cannot be accepted (refuses to accept the job) (step S208). Then the CPU 101 executes cancellation of the received job (step S209), followed by terminating the present job process.

If it is determined in the step S204 that the department ID management has been set to be off (NO to the step S204), the CPU 101 also proceeds to the step S208.

If it is determined in the step S202 that the job is received from other than the wireless LAN 118 (other than wireless communication) (NO to the step S202), the CPU 101 determines whether or not the department ID management has been set to be on (step S210). Then, if the department ID management has been not set to be on, in other words set to be off (NO to the step S210), the CPU 101 proceeds to the step S206.

On the other hand, if the department ID management has been set to be on (YES to the step S210), the CPU 101 determines whether or not the authentication result of the department ID is OK (step S211). If the authentication result of the department ID is OK (YES to the step S211), the CPU 101 proceeds to the step S206.

If the authentication result of the department ID is not OK (NO to the step S211), the CPU 101 determines that the job cannot be accepted (step S212). Then, the CPU 101 executes cancellation of the received job (step S213), followed by terminating the present job process.

If it is determined in the step S203 that the wireless LAN 118 has been set to the security setting (YES to the step S203), the CPU 101 proceeds to the step 210.

Thus, in the first embodiment, when a job is transmitted to the image forming apparatus 100 via the wireless LAN 118, if the wireless LAN has not been set to the security setting, unless the department ID management is on, the job is determined to be unacceptable. Further, even when the department ID management has been set to be on, unless the authentication result is OK, the job is determined to be unacceptable. Therefore, even when a job is received from an external apparatus, such as a PC, via a wireless LAN which has not been configured for security, an unauthorized access can be effectively prevented.

Next, a description will be given of an image forming apparatus as an information processing apparatus according to a second embodiment of the present invention.

Figure 7:
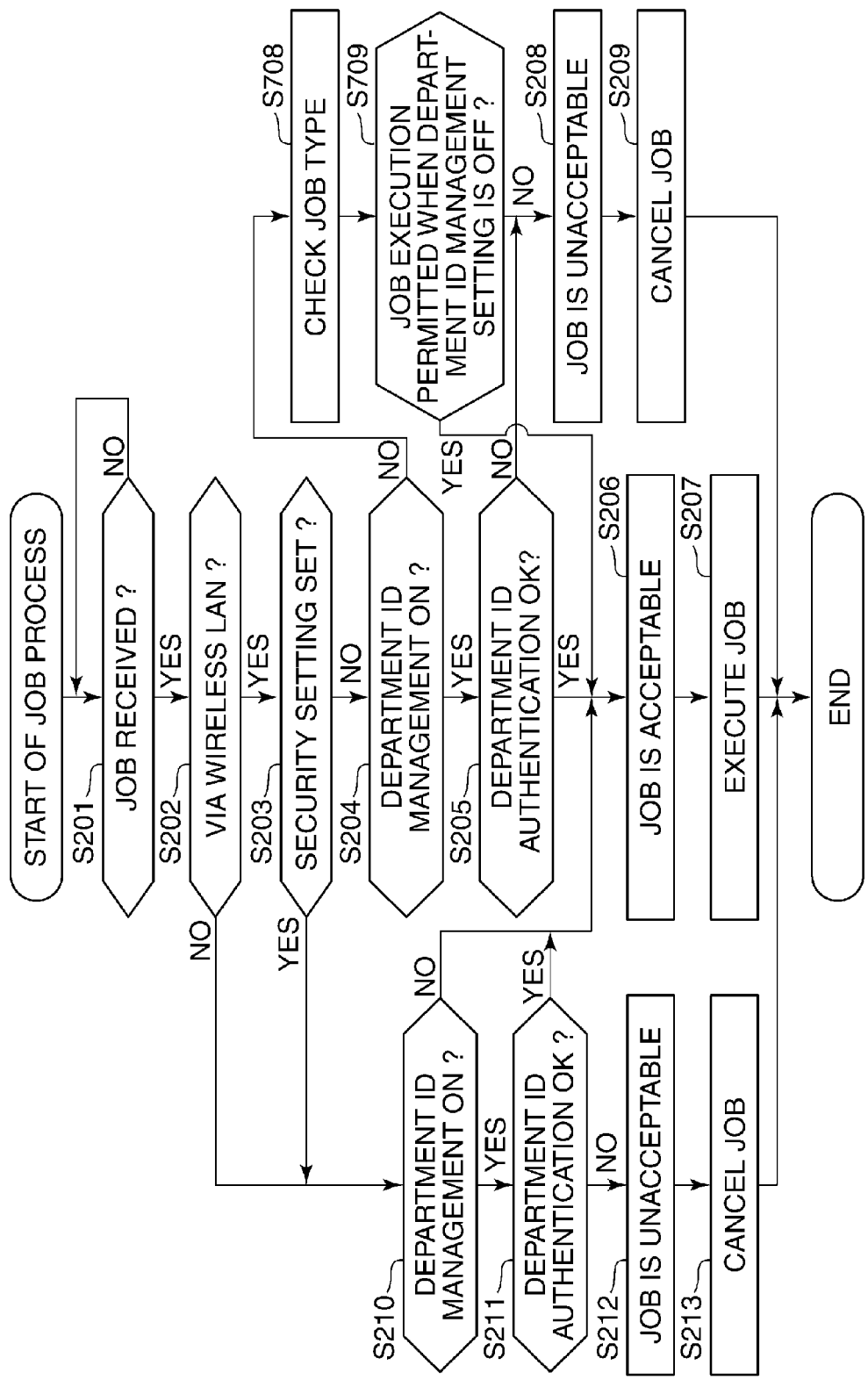
FIG. 7 is a flowchart of a job process executed by an image forming apparatus as an information processing apparatus according to a second embodiment of the present invention.

FIG. 7 is a flowchart of a job process in the image forming apparatus as the information processing apparatus according to the second embodiment. Note that the configuration of hardware of the image forming apparatus according to the second embodiment is the same as that of hardware of the image forming apparatus shown in FIG. 1, and hence description thereof will be omitted. In FIG. 7, the same steps as those in the flowchart shown in FIG. 5 are denoted by the same step numbers, and the description thereof will be omitted.

As described with reference to FIG. 5, in the step S204, the CPU 101 determines whether or not the department ID management has been set to be on. If the department ID management has not been set to be on (NO to the step S204), the CPU 101 checks a type of the job (step S708). For example, the CPU 101 determines whether the received job is a print job or a FAX (facsimile) job.

FIG. 8 is a diagram showing an example of a job execution permission/inhibition table in which permission or inhibition of job execution is set according to a job type, set in the image forming apparatus according to the second embodiment.

In FIG. 8, configuration of the job execution permission/inhibition table (job type-specific permission setting) is performed e.g. by an administrator using the console panel 109. Further, the job execution permission/inhibition table is stored in the data ROM 103c.

The job execution permission/inhibition table is a table for setting permission or inhibition of the job execution when the department ID management has been set to be off, on a job type basis. The example shown in FIG. 8 includes "print" and "FAX" as job types. Further, in a case where the department ID management has been set to be off, "print" is set to "execution permitted", and "FAX" is set to "execution inhibited".

After checking the job type, the CPU 101 determines whether or not the execution of the received job is permitted by referring to the job execution permission/inhibition table (step S709). If the execution of the job is permitted (YES to the step S709), the CPU 101 proceeds to the step S206. On the other hand, if the execution of the job is inhibited (NO to the step S709), the CPU 101 proceeds to the step S208.

Note that in the example shown in FIG. 8, although "print" and "FAX" are mentioned as job types, but any other job type e.g. image data processing, image data storage, etc. may be used as job types.

Thus, in the second embodiment, it is not only possible to prevent unauthorized access similarly to the first embodiment but also possible to execute processing of a job provided that it has no problem in executing the job in a case where the department ID management has been set to be off, whereby the user friendliness is improved.

Next, an image forming apparatus as an information processing apparatus according to a third embodiment of the present invention will be described.

FIG. 9 is a flowchart of a job process executed by the image forming apparatus as the information processing apparatus according to the third embodiment. Note that the configuration of hardware of the image forming apparatus according to the third embodiment is the same as that of hardware of the image forming apparatus shown in FIG. 1, and hence description thereof will be omitted. In FIG. 9, the same steps as those in the flowchart shown in FIG. 5 are denoted by the same step numbers, and the description thereof will be omitted.

As described with reference to FIG. 5, in a case where it is determined in the step S204 that the department ID management has been set to be off, or unless it is determined in the step S205 that the authentication result of the department ID management is OK, the CPU 101 determines that the job cannot be accepted (step S208), and executes cancelation of the job (step S209). In the third embodiment, following the step S209, information on the PC which is a job transmission source (terminal identification information) is recorded as a refusal history record in a refusal history table, for storage (step S910). Note that the refusal history table is stored e.g. in the data ROM 103a.

In general, when causing the image forming apparatus to execute the job via the wireless LAN 118, the PC 119c, which is the job transmission source, transmits at least the terminal identification information for identifying the PC 119c, together with the job. For example, the terminal identification information is a MAC address (Media Access Control address).

FIG. 10 is a diagram showing an example of a wireless LAN unauthorized access list displayed on the console panel 109 according to the refusal history table, in the image forming apparatus according to the third embodiment.

To view the refusal history, a user, such as an administrator, inputs a predetermined viewing password from the console panel 109. In response to this, the CPU 101 refers to the refusal history table (also referred to as unauthorized access history), and displays the refusal history on the console panel 109, as the wireless LAN unauthorized access list.

In the example of the wireless LAN unauthorized access list illustrated in FIG. 10, there are displayed the date and time, job type, and terminal identification information (apparatus identification information, e.g. MAC address) associated with each job the acceptance of which was refused. By viewing the wireless LAN unauthorized access list, the administrator or like user can easily grasp the actual conditions of unauthorized access to the image forming apparatus 100, and can easily take a countermeasure. Note that if a print button (not shown) is depressed on the console panel 109, the CPU 101 causes the printer section 106 to output the wireless LAN unauthorized access list as a report.

Thus, according to the third embodiment, it is not only possible to prevent unauthorized access similarly to the first embodiment but also to easily grasp actual conditions of unauthorized accesses in case of occurrence thereof.

Next, an image forming apparatus as an information processing apparatus according to a fourth embodiment of the present invention will be described.

FIG. 11 is a flowchart of a department ID management configuration process executed by an image forming apparatus as the information processing apparatus according to the fourth embodiment. Note that the configuration of hardware of the image forming apparatus according to the fourth embodiment is the same as that of hardware of the image forming apparatus shown in FIG. 1, and hence description thereof will be omitted.

First, as described above in the wireless LAN setting process shown in FIG. 2, the setting of wireless LANs is executed (step S1101). After execution of the setting of wireless LANs, the CPU 101 determines on an access AP-by-access AP basis, i.e. on a wireless LAN-by-wireless LAN basis whether or not the access AP, i.e. the wireless LAN has been set to the security setting (step S1102). Then, if it is determined that all the wireless LANs have been set to the security setting (YES to the step S1102), the CPU 101 terminates the configuration of the department ID management.

On the other hand, if it is determined that not all the wireless LANs have been set to the security setting (NO to the step S1102), the CPU 101 determines whether or not the department ID management has been set to be on (step S1103). If the department ID management has been set to be on (YES to the step S1103), the CPU 101 terminates the configuration of the department ID management.

If it is determined that the department ID management has not been set to be on (NO to the step S1103), the CPU 101 displays a warning display on the console panel 109 (step S1104).

FIG. 12 is a diagram showing an example of a warning display displayed on the console panel 109 appearing in FIG. 1.

In the example shown in FIG. 12, the warning display (selection screen) shows an message notifying that the wireless LAN has not been set to the security setting, and advising that the department ID management is set to be on. Then, if a "YES" button 1201 appearing in FIG. 12 is depressed, the CPU 101 receives an instruction for setting the department ID management to be on and closes the warning display. On the other hand, if a "NO" button 1202 is depressed, the CPU 101 closes the warning display without receiving an instruction for setting the department ID management to be on.

After executing display of the warning display, the CPU 101 determines whether or not an instruction for setting the department ID management to be on has been received (step S1105). If an instruction for setting the department ID management to be on has not been received (NO to the step S1105), the CPU 101 terminates the configuration of the department ID management.

If an instruction for setting the department ID management to be on has been received (YES to the step S1105), the CPU 101 changes the settings of the department ID management such that the department ID management is set to be on (step S1106), followed by terminating the configuration of the department ID management.

As described above, according to the fourth embodiment, it is not only possible to prevent unauthorized access similarly to the first embodiment, but also to positively prevent unauthorized access, by displaying a warning display, even in a case where an administrator or like user carelessly fails to set the department ID management to be on.

As is clear from the above description, in the hardware configuration shown in FIG. 1, the CPU 101 and the console panel 109 function as a first setting unit, a second setting unit, a third setting unit, a fourth setting unit, and a warning unit. Further, the CPU 101 and the wireless LAN interface 117 function as a reception unit. Further, the CPU 101 functions as a determination unit and a control unit.

Note that in the embodiments described above, although the image forming apparatus is described as an example of the information processing apparatus, the present invention is applicable to a case where an information processing apparatus other than the image forming apparatus, e.g. a computer, is used by an external apparatus via wireless communication.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

This application claims priority from Japanese Patent Application No. 2011-256102 filed Nov. 24, 2011, which is hereby incorporated by reference herein in its entirety.

What is claimed is:

1. An image forming apparatus comprising:
a management setting unit configured to enable or disable a management function for managing users who use the image forming apparatus;
a reception unit configured to receive a print job from an external apparatus via a wireless communication, the print job including user identification information;
a first determination unit configured to determine whether the management function has been enabled or disabled;
a job control unit configured to, in a case where it is determined by said first determination unit that the management function has been enabled, perform a user authentication based on the user identification information which is included in the print job and permit an execution of the print job when the user authentication is successful, while the job control unit being configured to, in a case where it is determined by said first determination unit that the management function has been disabled, permit the execution of the print job without processing the user authentication;
a wireless communication setting unit configured to set an encryption method of the wireless communication;
a second determination unit configured to determine whether or not the encryption method set by said the wireless communication setting unit has a predetermined security function; and
a warning display unit configured to display a warning message in a case where it is determined by said first determination unit that the management function has been disabled and it is determined by said second determination unit that the encryption method does not have the predetermined security function.

2. The information processing apparatus according to claim 1, wherein in a case where acceptance of the print job is refused, said job control unit records apparatus identification information on the external apparatus which has transmitted the print job, in an unauthorized access history.

3. The information processing apparatus according to claim 1, wherein said warning display unit displays a selection screen for selecting whether or not to enable the management function, and executes setting of the management function when selecting to enable the management function on the selection screen.

4. The information processing apparatus according to claim 1, wherein said reception unit is further configured to receive a job via a wired communication.

5. The information processing apparatus according to claim 4, wherein said job control unit is configured to control, in a case where said reception unit receives a first job via the wireless communication, whether or not to permit execution of the first job according to a job type of the first job, while control, when receiving a second job via the wired communication by said reception unit, to permit execution of the second job regardless of whether a job type of the second job.

6. The information processing apparatus according to claim 1, wherein the encryption method having the predetermined security function is WPA/WPA2.

7. A method of controlling an image forming apparatus, the method comprising:
receiving a print job from an external apparatus via a wireless communication, the print job including user identification information;
determining, whether a management function, for managing users, has been enabled or disabled;
performing, in a case where it is determined that the management function has been enabled, a user authentication based on the user identification information which is included in the print job and permitting an execution of the print job when the user authentication is successful, while, in a case where it is determined that the management function has been disabled, permitting the execution of the print job without processing the user authentication;
setting an encryption method of the wireless communication;
determining whether or not the set encryption method has a predetermined security function; and
displaying a warning message in a case where it is determined that the management function has been disabled and it is determined that the encryption method does not have the predetermined security function.

8. A non-transitory computer-readable storage medium storing a computer-executable program for causing a computer to execute a method of controlling an image forming apparatus,
wherein the method comprises:
receiving a print job from an external apparatus via a wireless communication, the print job including user identification information;
determining, whether a management function, for managing users, has been enabled or disabled;
performing, in a case where it is determined that the management function has been enabled, a user authentication based on the user identification information which is included in the print job and permitting an execution of the print job when the user authentication is successful, while, in a case where it is determined that the management function has been disabled, permitting the execution of the print job without processing the user authentication;
setting an encryption method of the wireless communication;
determining whether or not the set encryption method has a predetermined security function; and
displaying a warning message in a case where it is determined that the management function has been disabled and it is determined that the encryption method does not have the predetermined security function.

* * * * *